(12) United States Patent
Tan et al.

(10) Patent No.: US 11,833,549 B1
(45) Date of Patent: Dec. 5, 2023

(54) WIPING DEVICE AND CLEANING DEVICE

(71) Applicant: CONTEMPORARY AMPEREX TECHNOLOGY CO., LIMITED, Ningde (CN)

(72) Inventors: Xinyong Tan, Ningde (CN); Guanghua Tao, Ningde (CN); Tongzhang Liao, Ningde (CN); Weihai Yang, Ningde (CN); Yin Bai, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/356,348

(22) Filed: Jul. 21, 2023

Related U.S. Application Data

(63) Continuation of application No. PCT/CN2022/119110, filed on Sep. 15, 2022.

(30) Foreign Application Priority Data

Oct. 12, 2021 (CN) .......................... 202122457016.3

(51) Int. Cl.
*B08B 1/00* (2006.01)
*H01M 50/691* (2021.01)
*B08B 5/04* (2006.01)

(52) U.S. Cl.
CPC ................ *B08B 1/006* (2013.01); *B08B 5/04* (2013.01); *H01M 50/691* (2021.01)

(58) Field of Classification Search
CPC .. B08B 13/00; B08B 1/04; B08B 5/04; B08B 1/006; H01M 50/691
USPC ......................................................... 155/97.1
See application file for complete search history.

(56) References Cited

FOREIGN PATENT DOCUMENTS

| CN | 209491090 U | 10/2019 |
|---|---|---|
| CN | 111250476 A | 6/2020 |
| CN | 211303911 U | 8/2020 |
| CN | 214235199 U | 9/2021 |
| CN | 216369132 U | 4/2022 |
| JP | 2020089821 A | 6/2020 |
| TW | M452577 U | 5/2013 |

OTHER PUBLICATIONS

International Search Report for International Application PCT/CN2022/119110, dated Dec. 6, 2022.
Written Opinion of International Search Authority for International Application PCT/CN2022/119110, dated Dec. 6, 2022.

*Primary Examiner* — Katina N. Henson
(74) *Attorney, Agent, or Firm* — Ladas & Parry LLP

(57) ABSTRACT

The present application discloses a wiping device and a cleaning device. The wiping device includes: a rotating unit, a suction unit and a wiping head, where the suction unit, the rotating unit and the wiping head are sequentially arranged on a central axis, a wiping device hollow tube and a wiping head hollow tube are arranged on the central axis, the wiping device hollow pipe is arranged in the rotating unit, and the wiping head hollow pipe is arranged in the wiping head.

15 Claims, 4 Drawing Sheets

WIPING DEVICE AND CLEANING DEVICE

CROSS REFERENCE TO RELATED APPLICATIONS

The present application is a continuation of International Patent Application No. PCT/CN2022/119110, filed on Sep. 15, 2022, which claims priority to the Chinese patent application No. 202122457016.3, filed on Oct. 12, 2021. The entire contents of the aforementioned patent applications are incorporated herein by reference.

TECHNICAL FIELD

The present application relates to the field of batteries, in particular to a wiping device and cleaning device for cleaning a battery.

BACKGROUND

During a battery manufacturing process, it is necessary to wipe a liquid injection port of a battery cell after liquid injection. Current wiping devices are inefficient, and the existing method of using a wiping belt makes a battery prone to cross-contamination.

SUMMARY

In view of the above problems, embodiments of the present application provide a wiping device and cleaning device for cleaning a battery, which can increase a rotation speed of the wiping device to improve cleaning efficiency, and can avoid cross-contamination of the battery caused by a cleaning belt.

In a first aspect, embodiments of the present application provide a wiping device, including: a rotating unit, a suction unit and a wiping head, where the suction unit, the rotating unit and the wiping head are sequentially arranged on a central axis, a wiping device hollow tube and a wiping head hollow tube are arranged on the central axis, the wiping device hollow tube is arranged in the rotating unit, and the wiping head hollow tube is arranged in the wiping head.

In some embodiments, an inner diameter of the wiping device hollow tube is approximately equal to an inner diameter of the wiping head hollow tube. In technical solutions of the embodiments of the present application, the wiping device is coaxial with the wiping head and has the same inner diameter, so as to provide a smooth hollow channel.

In some embodiments, the wiping head includes a wiping head protrusion, and the wiping head protrusion protrudes outwardly from a bottom surface of the wiping head at a center of the wiping head. Such a design makes the wiping head protrusion match a liquid injection port of a battery in shape and size.

In some embodiments, a wiping head suction groove is arranged on a bottom surface of the wiping head. Through the setting of the wiping head suction groove, adsorption effect of the wiping head on a cleaning belt is enhanced.

In some embodiments, the wiping head includes a wiping head suction hole, and the wiping head suction hole extends inwardly from the bottom surface of the wiping head into the wiping head. The wiping head suction hole is designed to increase an adsorption force, which not only enhances the adsorption effect of the wiping head on the cleaning belt, but also assists in the adsorption of waste liquid, sundries, semi-liquid waste, or the like on the cleaning belt.

In some embodiments, the wiping head suction groove is in fluid communication with the wiping head suction hole. In such a design, the wiping head suction groove also functions as a liquid guiding groove.

In some embodiments, the suction unit allows a cleaning belt to be adsorbed on the wiping head through negative pressure. Through the setting of the suction unit, the cleaning belt is adsorbed on the wiping head.

In some embodiments, a lifting unit is further included, and the lifting unit is able to drive the wiping head to move in a vertical direction. By providing the lifting unit, the wiping head is able to be in a cleaning belt sheet absorption position, a battery wiping position and a cleaning belt discarding position respectively. When the wiping head is in the cleaning belt discarding position, the used cleaning belt is discarded, which avoids cross-contamination caused by the cleaning belt.

In some embodiments, the wiping device is a cylinder including a wiping head step portion, and the wiping head step portion is arranged on an outer peripheral surface of the wiping device. Due to the existence of the step portion, it is easier for the wiping head to cooperate with the rotating unit.

In a second aspect, embodiments of the present application provide a cleaning device including the wiping device in the above embodiments.

In some embodiments, a belt reel is further included, and a cleaning belt is wound on an outer circumference of the belt reel. The belt reel provides the cleaning belt in a roll.

In some embodiments, a cutting unit is further included, and the cutting unit cuts the cleaning belt delivered by the belt reel into a cleaning belt sheet having a predetermined length. Since the cleaning belt is cut into a segment of cleaning belt sheet having a predetermined length, the segment of cleaning belt sheet is discarded after one use, which avoids cross-contamination.

In some embodiments, a feeding unit is further included, and the feeding unit transfers the cleaning belt sheet to a location below the wiping device. The feeding unit is designed so that the cleaning belt sheet is positioned precisely.

In some embodiments, the suction unit adsorbs the cleaning belt sheet on the wiping head. The cut cleaning belt sheet having an appropriate size is adsorbed on the wiping head by an adsorption force provided by the suction unit.

In some embodiments, the battery is able to be moved so that a battery liquid injection port of the battery is aligned with a wiping head protrusion of the wiping head. By aligning the battery liquid injection port with the wiping head protrusion of the wiping head, wiping efficiency is improved.

In some embodiments, the rotating unit drives the wiping head to rotate, and the wiping head drives the cleaning belt sheet to wipe the battery liquid injection port. The rotation speed of the rotating unit can be adjusted, so that the wiping head can drive the cleaning belt sheet at high speed to wipe the battery liquid injection port.

In some embodiments, a collecting unit is further included, and the collecting unit sucks away the cleaning belt sheet having wiped the battery liquid injection port. Since the used cleaning belt sheet is sucked away, cross-contamination is avoided.

In some embodiments, the collecting unit sucks away the cleaning belt sheet having wiped the battery liquid injection port by vacuuming. Through such a design of vacuuming for the collecting unit, the collecting unit and the suction unit are allowed to share a vacuum system.

The above description is only an overview of the technical solutions of the present application. In order to understand the technical means of the present application more clearly, implementation can be made according to the contents of the specification, and in order to make the above and other purposes, features and advantages of the present application more obvious and understandable, the following specifically lists the specific embodiments of the present application.

In the technical solutions of embodiments of the present application, the suction unit provides negative pressure by means of a hollow setting, so as to adsorb a cleaning belt on the wiping head more firmly. Since the rotating unit drives the wiping head both are in a hollow structure, the cleaning belt can be implemented to be adsorbed on the wiping head by negative pressure.

BRIEF DESCRIPTION OF THE DRAWINGS

Various other advantages and benefits will become apparent to those of ordinary skill in the art upon reading the following detailed description of the preferred embodiments. The drawings are only for the purpose of illustrating the preferred embodiments and are not construed as limiting the present application. Moreover, in the whole drawings, like reference numerals are used to denote like components. In the drawings.

Figure 1:
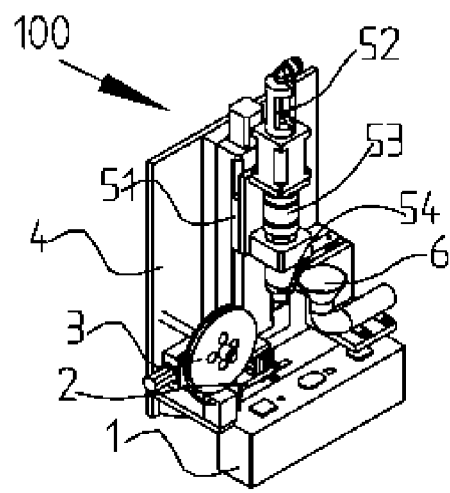
FIG. 1 is a schematic perspective view of a battery cleaning device according to an embodiment of the present application.

Reference numerals in the specific embodiments are as follows:

100: battery cleaning device,
1: battery,
11: battery liquid injection port,
2: cleaning belt,
3: belt reel,
4: support,
5: wiping device,
51: lifting unit,
52: suction unit,
53: rotating unit,
54: wiping head,
55: wiping device hollow tube,
541: wiping head protrusion,
542: wiping head suction hole,
543: wiping head suction groove,
544: wiping head step portion,
545: wiping head hollow tube,
6: collecting unit,
7: cutting unit,
8: feeding unit.

DETAILED DESCRIPTION

Embodiments of the technical solutions of the present application will be described in detail below in conjunction with the accompanying drawings. The following embodiments are only used to illustrate the technical solutions of the present application more clearly, and therefore are only examples, rather than limiting the protection scope of the present application.

Unless otherwise defined, all technical and scientific terms used herein have the same meaning as that commonly understood by those skilled in the technical field of the present application; the terms used herein are only for the purpose of describing specific embodiments, and are not intended to limit the present application; and the terms "comprising" and "having" and any variations thereof in the specification and claims of the present application as well as the above description of the drawings are intended to cover a non-exclusive inclusion.

In the description of the embodiments of the present application, technical terms such as "first" and "second" are only used to distinguish different objects, and should not be understood as indicating or implying relative importance or implicitly indicating the number, specific sequence, or primary-secondary relationship of the indicated technical features. In the description of the embodiments of the present application, "plurality" means two or more, unless otherwise specifically defined.

A phrase "embodiment" referred to herein means that a particular feature, structure, or characteristic described in combination with the embodiment can be included in at least one embodiment of the present application. The phrase occurred in various places of the specification does not necessarily all refer to the same embodiment, nor is it a separate or alternative embodiment mutually exclusive of another embodiment. Those skilled in the art understand in explicit and implicit manners that an embodiment described herein may be combined with another embodiment.

In the description of the embodiments of the present application, the term "and/or" is only a kind of association relationship describing associated objects, which means that there may be three kinds of relationships. For example, A and/or B may mean the following three cases: A exists alone, both A and B exist at the same time, and B exists alone. In addition, the character "/" herein generally indicates that the associated objects before and after the character are in an "of" relationship.

In the description of the embodiments of the present application, the term "a plurality of" refers to two or more (including two), similarly, "a plurality of groups" refers to two or more groups (including two), and "a plurality of pieces" refers to two or more pieces (including two pieces).

In the description of the embodiments of the present application, orientations or positional relationships indicated by technical terms "center", "longitudinal", "lateral", "length", "width", "thickness", "upper", "lower", "front", "rear", "left", "right", "vertical" "horizontal", "top", "bottom", "inner", "outer", "clockwise", "counterclockwise", "axial", "radial", "circumferential", or the like are based on orientations or positional relationships shown in the drawings, and are only for the convenience of describing the embodiments of the present application and simplifying the description, and do not indicate or imply that a device or element referred to must have a specific orientation, be constructed and operated in a specific orientation, and therefore cannot be understood as limitations to the embodiments of the present application.

In the description of the embodiments of the present application, unless otherwise clearly specified and defined, technical terms such as "installation", "interconnection", "connection" and "fixation" should be interpreted in a broad sense, for example, it can be a fixed connection, or a detachable connection, or an integrated connection; it can also be a mechanical connection, or an electrical connection; it can be a direct connection, or an indirect connection through an intermediary, and it can be internal communication between two elements or interaction relationship between two elements. Those of ordinary skill in the art can understand the specific meanings of the above terms in the embodiments of the present application according to specific situations.

At present, in the technical field of lithium battery manufacturing, wiping of a liquid injection port by a cleaning device cannot achieve the effect, and welding failure rate is high. This is because a contact area between a wiping head and the liquid injection port is small, and a cleaning belt is a pulling belt structure, and cannot carry out wiping in all directions. Rotary movement of the wiping head conflicts with the pulling structure of the cleaning belt, and the cleaning belt needs to be loosened for a certain length before wiping, so it is easy to fall off, failure rate is high, and troubleshooting time is long. Generally, the cleaning belt is a whole, and residual liquid of the previous battery is absorbed by the cleaning belt, and may flow to the rear cleaning belt, which causes the next battery to be polluted during wiping, and makes it easy for the battery to be cross-contaminated before and after wiping of a wiping belt. Since the cleaning belt is in a pulling structure, many tensioning structures are provided at both ends, and a cleaning belt located at the part of the tensioning structures does not participate in cleaning so that utilization rate of the cleaning belt is low.

The applicant noticed that all-round wiping of a liquid injection port can be realized by designing a wiping head to be in a porous profiling shape, and a cleaning belt in the shape of an independent sheet. A hollow design of the entire rotating mechanism can absorb residual liquid and remove the cleaning belt through negative pressure, which can improve wiping effect. Moreover, a cutting structure is used in conjunction with the rotary wiping mechanism, which can realize rotary wiping at high speed while avoiding cross-contamination of a battery cell, and therefore improve the wiping effect.

The applicant also found that using a feeding mechanism to deliver the cleaning belt can prevent the cleaning belt from falling off. Pressure of a pressing module and a pressing sheet of the feeding mechanism can be adjusted, and a wiping process can be monitored in real time, so as to realize a closed-loop control of the pressure. This can not only improve the wiping effect and solve the cross-contamination of an electrolyte, but also improve the utilization rate of the cleaning belt by adopting cutting and feeding mechanisms. A clamp cylinder is used to clamp feeding material, which can prevent the cleaning belt from falling off.

Based on the above considerations, the applicant found that the use of the feeding and cutting mechanisms not only reduces occupied space, but also improves the utilization rate of the cleaning belt. A finger cylinder clamps the cut cleaning belt and sends it to the corresponding position, then the hollow wiping structure descends, and the porous profiling wiping head rotates to carry out wiping while absorbing the residual liquid, which not only reduces cross-contamination of the electrolyte, but also improves the wiping effect.

According to an embodiment disclosed in the embodiments of the present application, a rotary wiping structure is provided with a servo motor having a module movement on upper and lower sides, so that pressure and a wiping process of the cleaning belt are precise and controllable. Multiple holes and grooves are designed in the middle of and around the profiling wiping head, which can accelerate the removal of residual liquid.

Figure 2:
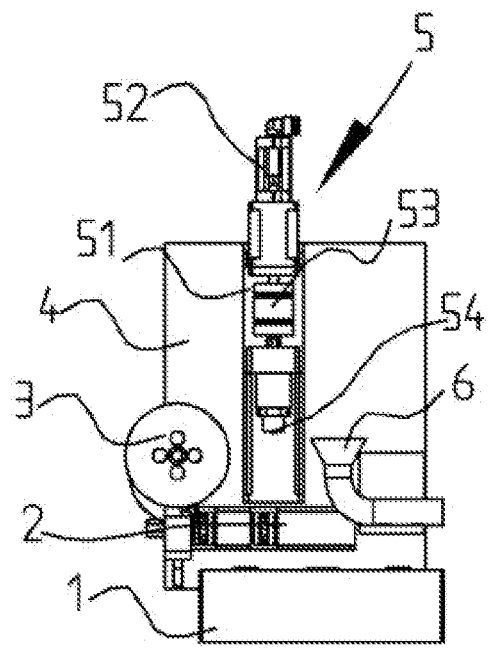
FIG. 2 is a schematic structural diagram of a front view of a battery cleaning device according to an embodiment of the present application.

According to some embodiments of the present application, provided is a wiping device 5. As shown in FIG. 2, the wiping device 5 includes: a rotating unit 53, a suction unit 52 and a wiping head 54. The suction unit 52, the rotating unit 53 and the wiping head 54 are sequentially arranged on a central axis, a wiping device hollow tube 55 and a wiping head hollow tube 545 are arranged on the central axis, the wiping device hollow tube 55 is arranged in the rotating unit 53, and the wiping head hollow tube 545 is arranged in the wiping head 54. In the technical solutions of the embodiments of the present application, the suction unit 52 provides negative pressure by means of a hollow setting, so as to adsorb a cleaning belt 2 on the wiping head 54 more firmly.

Figure 5:
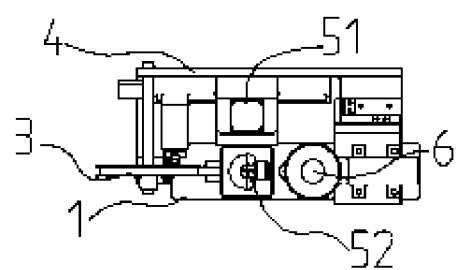
FIG. 5 is a schematic structural diagram of a top view of a battery cleaning device according to an embodiment of the present application.

According to some embodiments of the present application, as shown in FIG. 5, the wiping device hollow tube 55 is arranged at a central axis of the rotating unit 53, the wiping head hollow tube 545 is arranged at a central axis of the wiping head 54, and the central axis of the rotating unit 53 is collinear with the central axis of wiping head 54. In the technical solutions of the embodiments of the present application, the rotating unit drives the wiping head to rotate at high speed. Moreover, since the rotating unit drives the wiping head both are in a hollow structure, the cleaning belt can be implemented to be adsorbed on the wiping head by negative pressure.

According to some embodiments of the present application, an inner diameter of the wiping device hollow tube 55 is approximately equal to an inner diameter of the wiping head hollow tube 545. In the technical solutions of the embodiments of the present application, the wiping device is coaxial with the wiping head and has the same inner diameter, so as to provide a smooth hollow channel.

Figure 8:
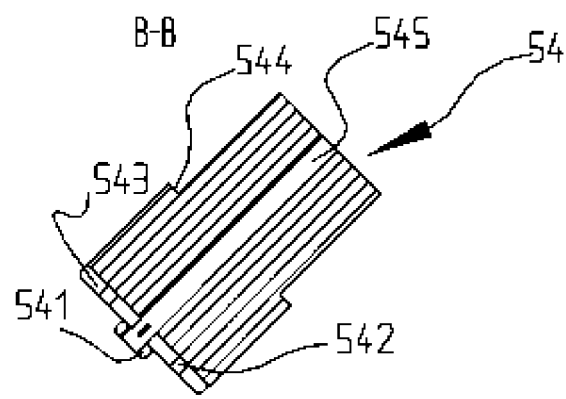
FIG. 8 is a schematic diagram of a B-B sectional structure of the wiping head of the wiping device according to the embodiment of the present application as shown in FIG. 7.
Figure 9:
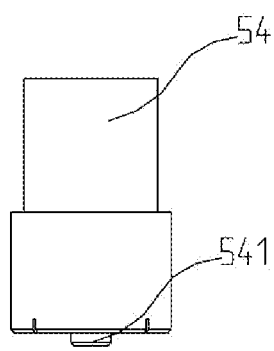
FIG. 9 is a schematic structural diagram of a front view of a wiping head of a wiping device according to an embodiment of the present application.

According to some embodiments of the present application, as shown in FIGS. 8 and 9, the wiping head 54 includes a wiping head protrusion 541, and the wiping head protrusion 541 protrudes outwardly from a bottom surface of the wiping head 54 at a central axis of the wiping head 54. Such a design makes the wiping head protrusion match a liquid injection port of a battery in shape and size.

Figure 7:
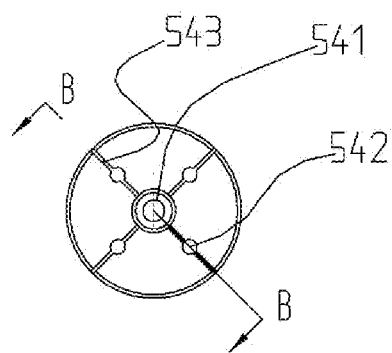
FIG. 7 is a schematic bottom view of a wiping head of a wiping device according to an embodiment of the present application.

According to some embodiments of the present application, as shown in FIG. 7, a wiping head suction groove 543 is arranged on a bottom surface of the wiping head 54. Through the setting of the wiping head suction groove 543, adsorption effect of the wiping head 54 on the cleaning belt is enhanced.

According to some embodiments of the present application, as shown in FIG. 7, the wiping head 54 includes a wiping head suction hole 542, and the wiping head suction hole 542 extends inwardly from the bottom surface of the wiping head 54 into the wiping head 54. The wiping head suction hole is designed to increase an adsorption force, which not only enhances the adsorption effect of the wiping head 54 on the cleaning belt 2, but also assists in the adsorption of waste liquid, sundries, semi-liquid waste, or the like on the cleaning belt.

According to some embodiments of the present application, as shown in FIG. 7, the wiping head suction groove 543 is in fluid communication with the wiping head suction hole 542. In such a design, the wiping head suction groove 543 also functions as a liquid guiding groove.

According to some embodiments of the present application, the suction unit 52 allows a cleaning belt 2 to be adsorbed on the wiping head 54 through negative pressure. Through the setting of the suction unit 52, the cleaning belt is adsorbed on the wiping head 54.

According to some embodiments of the present application, as shown in FIG. 1, a lifting unit 51 is further included, and the lifting unit 51 is able to drive the wiping head 54 to move in a vertical direction. By providing the lifting unit 51, the wiping head 54 is able to be in a cleaning belt sheet absorption position, a battery 1 wiping position and a cleaning belt discarding position respectively. When the wiping head 54 is in the cleaning belt discarding position, the used cleaning belt is discarded, which avoids cross-contamination caused by the cleaning belt.

Figure 6:
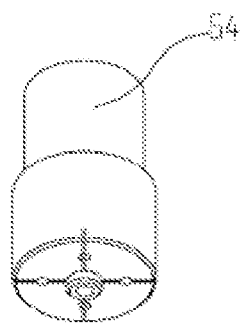
FIG. 6 is a schematic perspective view of a wiping head of a wiping device according to an embodiment of the present application.

According to some embodiments of the present application, as shown in FIGS. 6 and 8, the wiping device 5 is a cylinder including a wiping head step portion 544, and the wiping head step portion 544 is arranged on an outer peripheral surface of the wiping device 5. Due to the existence of the step portion 544, the wiping head 54 is easier to cooperate with the rotating unit 53.

According to some embodiments of the present application, as shown in FIG. 1, the present application provides a cleaning device 100 including the wiping device 5 in the above embodiments.

According to some embodiments of the present application, as shown in FIG. 1, the cleaning device 100 further includes a belt reel 3, and the cleaning belt 2 is wound on an outer circumference of the belt reel 3. The belt reel 3 provides the cleaning belt 2 in a roll.

Figure 4:
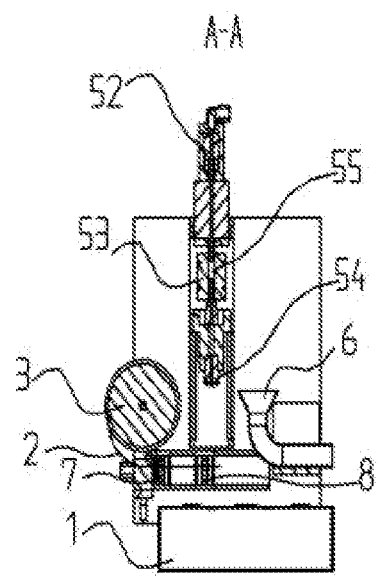
FIG. 4 is a schematic diagram of an A-A sectional structure of the battery cleaning device according to the embodiment of the present application as shown in FIG. 3.

According to some embodiments of the present application, as shown in FIG. 4, the cleaning device 100 further includes a cutting unit 7, and the cutting unit 7 cuts the cleaning belt 2 delivered by the belt reel 3 into a cleaning belt sheet having a predetermined length. The cleaning belt 2 is cut into the cleaning belt sheet having a predetermined length, and the cleaning belt is discarded after one use, which avoids cross-contamination.

According to some embodiments of the present application, as shown in FIG. 4, the cleaning device 100 further includes a feeding unit 8, and the feeding unit 8 transfers the cleaning belt sheet to a location below the wiping device 5. The feeding unit 8 is designed such that the cleaning belt sheet is positioned precisely.

According to some embodiments of the present application, the suction unit 52 adsorbs the cleaning belt sheet on the wiping head 54. The cut cleaning belt sheet having an appropriate size is adsorbed on the wiping head 54 by an adsorption force provided by the suction unit 52.

According to some embodiments of the present application, the battery 1 is able to be moved so that a battery liquid injection port 11 of the battery 1 is aligned with a wiping head protrusion 541 of the wiping head 54. By aligning the battery liquid injection port 11 with the wiping head protrusion 541 of the wiping head 54, wiping efficiency is improved.

According to some embodiments of the present application, the rotating unit 53 drives the wiping head 54 to rotate, and the wiping head 54 drives the cleaning belt sheet to wipe the battery liquid injection port 11. The rotation speed of the rotating unit 53 can be adjusted, so that the wiping head 54 can drive the cleaning belt sheet at high speed to wipe the battery liquid injection port 11.

According to some embodiments of the present application, as shown in FIG. 2, the cleaning device 100 further includes a collecting unit 6, and the collecting unit 6 sucks away the cleaning belt sheet having wiped the battery liquid injection port 11. Since the used cleaning belt sheet is sucked away, cross-contamination is avoided.

According to some embodiments of the present application, the collecting unit 6 sucks away the cleaning belt sheet having wiped the battery liquid injection port 11 by vacuuming. Through such a design of vacuuming for the collecting unit, the collecting unit and the suction unit are allowed to share a vacuum system.

According to some embodiments of the present application, the collecting unit 6 includes a sliding cylinder, a connecting plate and a funnel. The collecting unit 6 can slide to a collection position, and sucks away the used cleaning belt sheet through the funnel of a large diameter.

According to some embodiments of the present application, the feeding unit 8 includes a tensioning roller, a roller fixing rod, a motor module and a finger cylinder. Such a design of the feeding unit 8 can tension the cleaning belt and transport the cleaning belt to a proper position accurately.

Figure 10:
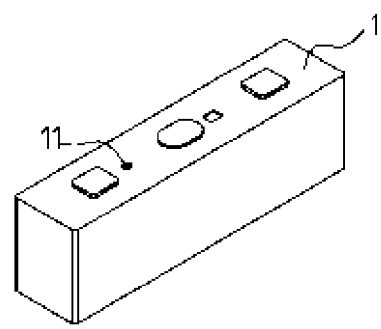
FIG. 10 is a schematic perspective view of a battery wiped by using a wiping head of a wiping device according to an embodiment of the present application.

FIG. 1 is a schematic perspective view of a battery cleaning device according to an embodiment of the present application. According to some embodiments of the present application, provided is a battery cleaning device 100, including: a support 4, a belt reel 3 and a wiping device 5. The belt reel 3 and the wiping device 5 are supported on the support 4. The belt reel 3 is used to deliver a cleaning belt 2. The wiping device 5 includes: a lifting unit 51, a suction unit 52, a rotating unit 53 and a wiping head 54. The wiping device 5 is movably supported on the support 4 via the lifting unit 51. The lifting unit 51 can allow the wiping head 54 to move up and down in a vertical direction, so that the wiping head 54 is aligned with a battery liquid injection port 11 of a battery 1 as shown in FIG. 10.

FIG. 2 is a schematic structural diagram of a front view of a battery cleaning device according to an embodiment of the present application. According to some embodiments of the present application, provided is a battery cleaning device 100, including: a support 4, a belt reel 3, a wiping device 5 and a collecting unit 6. The collecting unit 6 includes a sliding cylinder, a connecting plate, a funnel and connecting pipes connected to a vacuum system. After a wiping head 54 wipes a battery liquid injection port 11 of a battery 1 clean, the collecting unit 6 slides to a location below the wiping head 54 to take away a used cleaning belt 2.

Figure 3:
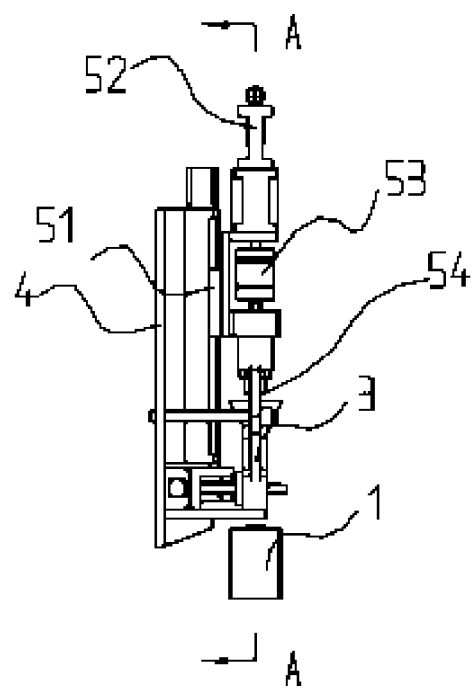
FIG. 3 is a schematic structural diagram of a side view of a battery cleaning device according to an embodiment of the present application.

FIG. 3 is a schematic structural diagram of a side view of a battery cleaning device according to an embodiment of the present application. According to some embodiments of the present application, provided is a wiping device 5, including: a lifting unit 51, a suction unit 52, a rotating unit 53 and a wiping head 54. The rotating unit 53 can drive the wiping head 54 to rotate at high speed. The rotation speed of the wiping head 54 is adjustable. According to one embodiment of the present application, the rotation speed can reach 2-20 revolutions/second.

FIG. 4 is a schematic diagram of an A-A sectional structure of the battery cleaning device according to the embodiment of the present application as shown in FIG. 3. According to some embodiments of the present application, provided is a battery cleaning device 100, including: a belt reel 3, a wiping device 5, a collecting unit 6, a feeding unit 8 and a cutting unit 7. The cutting unit 7 cuts a cleaning belt 2 delivered by the belt reel 3. The feeding unit 8 delivers the cut cleaning belt 2 to a location below the wiping head 54 of the wiping device 5. The suction unit 52 of the wiping device 5 adsorbs the cut cleaning belt 2 on the wiping head 54 by suction. The rotating unit 53 can drive the wiping head 54 to rotate at high speed, and the wiping head 54 drives the cut cleaning belt 2 to rotate on a battery liquid injection port 11 of a battery 1 to wipe the battery liquid injection port 11.

FIG. 5 is a schematic structural diagram of a top view of a battery cleaning device according to an embodiment of the present application. According to some embodiments of the present application, provided is a battery cleaning device 100, including: a belt reel 3, a wiping device 5, a feeding unit 8 and a collecting unit 6. The feeding unit 8 and the collecting unit 6 can move in a horizontal direction, the wiping device 5 can move in a vertical direction, and the horizontal direction is orthogonal to the vertical direction. A central axis of the feeding unit 8 moving in the horizontal direction may be collinear with a central axis of the collecting unit 6 moving in the horizontal direction.

According to some embodiments of the present application, provided is a wiping head 54 of a wiping device, including: a wiping head protrusion 541, a wiping head suction hole 542, a wiping head suction groove 543, a wiping head step portion 544 and a wiping head hollow tube 545. FIG. 6 is a schematic perspective view of a wiping head 54 of a wiping device according to an embodiment of the present application; FIG. 7 is a schematic bottom view of a wiping head of a wiping device according to an embodiment of the present application; FIG. 8 is a schematic diagram of a B-B sectional structure of the wiping head of the wiping device according to the embodiment of the present application as shown in FIG. 7; and FIG. 9 is a schematic structural diagram of a front view of a wiping head of a wiping device according to an embodiment of the present application. As shown in FIG. 6, the wiping head 54 is in a shape of a cylinder having a wiping head step portion 544. A wiping head protrusion 541 is provided at a center of the wiping head 54. A plurality of wiping head suction holes 542 are distributed at a certain position away from the center of the wiping head 54. As shown in FIG. 7, four wiping head suction holes 542 are equidistantly distributed at a certain position away from the center of the wiping head 54. A plurality of wiping head suction grooves 543 are provided on a bottom surface of the wiping head 54. As shown in FIG. 7, two wiping head suction grooves 543 are provided on the bottom surface of wiping head 54, and each of the wiping head suction grooves 543 runs through the center of wiping head 54 and two wiping head suction holes 542, and has a length approximately equal to a diameter of the bottom surface of the wiping head 54. When vacuuming is carried out through a wiping head hollow tube 545, the wiping head 54 sucks a cleaning belt 2, and the wiping head suction hole 542 and the wiping head suction groove 543 provide assistance for the wiping head 54 to suck the cleaning belt 2, and contribute to adsorption of waste liquid, sundries, semi-liquid waste, or the like on the cleaning belt. As shown in FIG. 8, the wiping head 54 of the wiping device includes the wiping head hollow tube 545, and the wiping head hollow tube 545 transmits an adsorption force required for the wiping head 54, the wiping head suction hole 542 and the wiping head suction groove 543 to suction the cleaning belt 2, waste liquid, sundries, semi-liquid waste, or the like. A central axis of the wiping head hollow tube 545 is approximately collinear with a central axis of the wiping device hollow tube 55 as shown in FIG. 4.

According to some embodiments of the present application, provided is a cleaning device, including:

1. An unwinding mechanism: mainly including an unwinding tray, a quick-release fixing ring and a fixed shaft group, and having a function of storing and unwinding a material.

2. A cutting mechanism: mainly composed of upper and lower cylinders and upper and lower cutters, and having a function of cutting a cleaning belt.

3. A sheet feeding mechanism: mainly composed of a tensioning roller, a spring, a roller fixing rod, a motor module, and a finger cylinder, and having a function of tensioning the cleaning belt and transporting the cleaning belt.

4. A rotary wiping mechanism: mainly composed of a wiping head, a rotating and wiping mechanism, and a pressing and lifting mechanism, and having a function of driving an independent cleaning sheet to conduct wiping, absorb residual liquid, and suck and discharge the used cleaning sheet.

5. A vacuum assembly: mainly composed of a vacuum system, an air pipe and an air pipe joint, where a main function of the vacuum assembly is to absorb residual liquid and waste belt.

6. A sheet collecting mechanism: mainly composed of a sliding cylinder, a connecting plate, and a funnel, and having a function of collecting the used cleaning belt.

According to some embodiments of the present application, the cleaning device is used as follows:

1. After injecting liquid, a battery cell enters a station for positioning.

2. The unwinding mechanism of the cleaning belt unwinds the material.

3. When the cleaning belt reaches a specified length, the cleaning belt is cut off, and the finger cylinder clamps the cleaning belt and moves it to a designated position.

4. The rotary wiping mechanism descends and rotates to conduct wiping.

5. After the wiping finishes, a rotary wiping unit absorbs a cleaning belt sheet to ascend, and at the same time, the battery cell moves out.

6. A sheet collecting unit stretches out, and the rotary wiping mechanism blows air to discard the cleaning belt sheet.

7. The sheet collecting unit sucks away the cleaning belt and retreats.

Finally, it should be noted that: the above embodiments are only used to illustrate the technical solutions of the present application, and are not intended to make limitation; although the present application has been described in detail with reference to the foregoing embodiments, those of ordinary skill in the art should understand that: it is still possible to modify the technical solutions described in the foregoing embodiments, or perform equivalent replacements for some or all of the technical features; and these modifications or replacements do not make the essence of the corresponding technical solutions deviate from the technical solutions of various embodiments of the present application. All of them should be covered by the scope of the claims and specification of the present application. In particular, as long as there is no structural conflict, the technical features mentioned in the various embodiments can be combined in any manner. The present application is not limited to the specific embodiments disclosed herein, but includes all technical solutions falling within the scope of the claims.

What is claimed is:

1. A wiping device, comprising:
a rotating unit;
a suction unit; and
a wiping head,
wherein
the suction unit, the rotating unit and the wiping head are sequentially arranged on a central axis;
a wiping device hollow tube and a wiping head hollow tube are arranged on the central axis;
the wiping device hollow tube is arranged in the rotating unit; and
the wiping head hollow tube is arranged in the wiping head.

2. The wiping device according to claim 1, wherein an inner diameter of the wiping device hollow tube is equal to an inner diameter of the wiping head hollow tube.

3. The wiping device according to claim 1, wherein the wiping head comprises a wiping head protrusion, and the wiping head protrusion protrudes outwardly from a bottom surface of the wiping head at a center of the wiping head.

4. The wiping device according to claim 1, wherein a wiping head suction groove is arranged on a bottom surface of the wiping head.

5. The wiping device according to claim 4, wherein the wiping head comprises a wiping head suction hole, and the wiping head suction hole extends inwardly from the bottom surface of the wiping head into the wiping head.

6. The wiping device according to claim 5, wherein the wiping head suction groove is in fluid communication with the wiping head suction hole.

7. The wiping device according to claim 1, wherein the suction unit is configured to allow a cleaning belt to be adsorbed on the wiping head through a negative pressure.

8. The wiping device according to claim 1, further comprising a lifting unit, wherein the lifting unit is configured to drive the wiping head to move in a vertical direction, so that the wiping head is placed in a cleaning belt sheet absorption position, a battery wiping position and a cleaning belt discarding position, respectively.

9. The wiping device according to claim 1, wherein the wiping device is a cylinder including a wiping head step portion, and the wiping head step portion is arranged on an outer peripheral surface of the wiping device.

10. A cleaning device, comprising the wiping device according to claim 1, configured to clean a battery.

11. The cleaning device according to claim 10, further comprising a belt reel, wherein a cleaning belt is wound on an outer circumference of the belt reel.

12. The cleaning device according to claim 11, further comprising a cutting unit, wherein the cutting unit cuts the cleaning belt delivered by the belt reel into a cleaning belt sheet having a predetermined length.

13. The cleaning device according to claim 10, further comprising a feeding unit, wherein the feeding unit is configured to transfer a cleaning belt sheet to a location below the wiping device.

14. The cleaning device according to claim 13, wherein
the suction unit adsorbs the cleaning belt sheet on the wiping head; and
the battery is able to be moved, so that a battery liquid injection port of the battery is aligned with a wiping head protrusion of the wiping head.

15. The cleaning device according to claim 13, wherein the rotating unit is configured to drive the wiping head to rotate, and the wiping head is configured to drive the cleaning belt sheet to wipe the battery liquid injection port; and
wherein the cleaning device further comprises a collecting unit, configured to suck away the cleaning belt sheet having wiped the battery liquid injection port by vacuuming.

\* \* \* \* \*